United States Patent

Fumagalli

(10) Patent No.: US 10,316,264 B2
(45) Date of Patent: Jun. 11, 2019

(54) WATER IN DIESEL OIL FUEL MICRO-EMULSIONS

(71) Applicant: EME INTERNATIONAL LIMITED, St Julians (MT)

(72) Inventor: Marco Luigi Fumagalli, Lecco (IT)

(73) Assignee: EME INTERNATIONAL LIMITED, St. Julians (MT)

( * ) Notice: Subject to any disclaimer, the term of this patent is extended or adjusted under 35 U.S.C. 154(b) by 58 days.

(21) Appl. No.: 15/525,739

(22) PCT Filed: Oct. 23, 2015

(86) PCT No.: PCT/EP2015/074595
§ 371 (c)(1),
(2) Date: May 10, 2017

(87) PCT Pub. No.: WO2016/074904
PCT Pub. Date: May 19, 2016

(65) Prior Publication Data
US 2017/0321138 A1   Nov. 9, 2017

(30) Foreign Application Priority Data

Nov. 10, 2014  (IT) .............................. MI2014A1933

(51) Int. Cl.
*C10L 1/32* (2006.01)
*B01F 17/00* (2006.01)

(52) U.S. Cl.
CPC .......... *C10L 1/328* (2013.01); *B01F 17/0085* (2013.01); *C10L 2200/0446* (2013.01); *C10L 2250/084* (2013.01); *C10L 2250/086* (2013.01)

(58) Field of Classification Search
CPC ............. C10L 1/328; C10L 2200/0295; C10L 2250/086
USPC ................................... 44/301, 302
See application file for complete search history.

(56) References Cited

U.S. PATENT DOCUMENTS

| | | | | |
|---|---|---|---|---|
| 7,887,604 B1* | 2/2011 | Hicks | ....................... | C10L 10/02 44/301 |
| 2002/0088167 A1* | 7/2002 | Filippini | ................. | C10L 1/328 44/301 |
| 2003/0134755 A1* | 7/2003 | Martin | .................... | C10L 1/328 508/295 |
| 2004/0055210 A1* | 3/2004 | Lif | ....................... | B01F 17/0042 44/302 |
| 2004/0229765 A1* | 11/2004 | Gutierrez | ............ | B01F 17/0021 510/417 |
| 2005/0183324 A1* | 8/2005 | Marelli | .................... | C10L 1/328 44/301 |
| 2006/0048443 A1* | 3/2006 | Filippini | ................. | C10L 1/328 44/301 |
| 2007/0028507 A1 | 2/2007 | Strey et al. | | |
| 2007/0261293 A1* | 11/2007 | Tajima | ................ | B01F 17/0028 44/301 |
| 2009/0118380 A1* | 5/2009 | Del Gaudio | ......... | A61K 9/1075 514/772 |
| 2009/0300969 A1* | 12/2009 | Martin | .................... | C10L 1/328 44/301 |
| 2010/0037513 A1* | 2/2010 | Petrucci | .................. | C10L 1/328 44/301 |
| 2012/0291339 A1* | 11/2012 | Martin | .................... | C10L 1/143 44/302 |
| 2013/0118058 A1* | 5/2013 | Nguyen | ................ | C10L 1/1802 44/302 |
| 2014/0311020 A1* | 10/2014 | Klausmeier | ........... | C10L 1/1881 44/411 |

FOREIGN PATENT DOCUMENTS

| | | |
|---|---|---|
| EP | 0595640 A1 | 5/1994 |
| EP | 2612898 A1 | 7/2013 |
| WO | 9818884 A2 | 5/1998 |
| WO | 2007083106 A2 | 7/2007 |

OTHER PUBLICATIONS

International Search Report and Written Opinion for PCT/EP2015/074595, dated Jan. 21, 2016.

* cited by examiner

*Primary Examiner* — Ellen M McAvoy
(74) *Attorney, Agent, or Firm* — Jones Robb, P.L.L.C.

(57) ABSTRACT

A water in diesel oil fuel micro-emulsion for internal combustion diesel engines, with a low content of surfactants, a very long shelf-life, a reduced production of pollutants and carbonaceous side-products generated by the combustion and very good engine performance, is described. These emulsions comply with the strict requirements of Italian regulations and are particularly useful as fuels for automotive and heating applications.

18 Claims, No Drawings

WATER IN DIESEL OIL FUEL MICRO-EMULSIONS

This application is a national stage application under 35 U.S.C. § 371(c) of International Application No. PCT/EP2015/074595, filed on Oct. 23, 2015, which claims priority to Italian Application No. MI2014A001933, filed Nov. 10, 2014, the entire contents of each of which is incorporated by reference herein.

FIELD OF THE INVENTION

The present invention relates to a water in diesel oil fuel micro-emulsion, in particular to a water in diesel oil fuel micro-emulsion for internal combustion diesel engines. This micro-emulsion is endowed with a long shelf-life and, compared with conventional diesel oils, provides for a reduction in combustion-generated pollutants and a comparable engine out-put.

BACKGROUND OF THE INVENTION

Water in diesel oil emulsions are nowadays known and used as fuels in diesel internal combustion engines and in heating burners, with the purpose of reducing the presence of harmful pollutants in exhaust gases, such as NOx, SOx, CO and particulate matter (PM) without compromising engine's performance.

The practice of adding water to diesel oil dates back to the early 1900s, and there are many different patented implementations. Depending on the application, the water content may vary from 8% to 35%, with a typical 13% water formulation for use in diesel engines.

There are several benefits in adding water to diesel oil. Water vaporization in the combustion chamber provides for fuel dispersion in the form of very small droplets and increases the contact surface between fuel and air. As a result, combustion is more efficient, homogeneous and with lower thermal peaks, thereby reducing poison emissions such as NOx and PM and other unwanted by-products. Nowadays, emulsion fuel technology is considered as one of the most promising solutions to the conservation of fossil fuels. However, there are very few real emulsions on the market due to their scarce stability, reduced power and excessive costs.

Technically these emulsions, also named "white diesel oils" for their peculiar color, are emulsions of water in diesel oil, i.e., W/O emulsions in which water, in the form of small particles or droplets, is uniformly distributed within diesel oil. In these systems, water is the dispersed internal or discontinuous phase, whereas diesel oil is the dispersion medium also known as the external or continuous phase. To date, many different attempts have been made to put the technology into a widespread commercial use, although they have substantially failed to yield reliable and reproducible performance.

The first emulsions were not satisfactory. In fact, they required modifications of the combustion apparatus, did not guarantee an optimal dispersion of water in diesel oil and were not stable enough over time thus compromising the expected reduction of emissions and the calorific yield of the combustion process.

Furthermore, these old emulsions were rather expensive due to the high cost of the production equipment and of the emulsifying agents.

Emulsions are, by nature, physically unstable that is, when stored they tend over time to separate into two distinct phases or layers, with the aqueous phase at the bottom. The phenomenon of complete and irreversible separation of the dispersed phase (water) is known as coalescence.

When phase separation occurs, for instance in a tank, the fuel may cause a considerable worsening of the performance of the engine and even its permanent damage. In fact, the presence of a bulk aqueous phase may cause seizing of feeding pumps and of fuel injectors. The fuel may fail to ignite when the machine is started or stopped due to the lower combustion temperatures, it may become corrosive and may freeze at lower temperatures.

The Applicant further observed that, since the phase separation gradually proceeds, also the combustion efficiency of the fuel over time varies and its assessment provides for variable values depending on the moment the combustion experiment is performed.

High stability over time and under a wide temperature range—e.g., at least four months under normal storage conditions and between $-20°$ C. and $+50°$ C.—is an essential requirement for a commercial product and in particular it is mandatory under Italian law regulating fuel emulsions.

There have been many attempts to manufacture stable water in diesel oil emulsions but very few reached the market.

System stabilization has been tried mainly by using specific surfactants and/or mechanical means, which allow the emulsion to stay homogeneous over a period sufficiently long to be used without separation of the two immiscible phases.

In the preparation of emulsions, manufacturing conditions are at least as crucial as the selection of proper surfactants. Common methods for preparing emulsions require energy to be added to the system in some form. Energy may be supplied in a variety of ways e.g. trituration, homogenization, shaking, stirring, and heat.

The energy necessary to reach the emulsified state is considerable and is higher when the surface tension of the two phases is very high. In order to lower the energy content of the system—thus increasing its thermodynamic stability—it is important not only to add surfactants, which reduce surface tension, but also to ensure the formation of the highest possible number of colloidal particles and thoroughly disperse them.

Emulsifying agents have been added to prevent coalescence but the development of these agents is still in the fledgling stage and presents several challenges, including possible negative effects on combustion.

Over the years, several studies focused on emulsifying compositions, which afforded a uniform dispersion of water in diesel oil through generation of micelles.

Several surfactants, above a certain concentration value known as the critical micelle concentration (CMC), organizes themselves in supramolecular aggregates named micelles. In apolar solvents, the hydrophilic part of the surfactants is oriented inwards, while the hydrophobic part is oriented outwards. Above the C.M.C., several properties of the system are positively affected: solubility increases, interfacial tension decreases and the overall stability of the emulsion improves.

Over the years, the size of the dispersed phase particles has become smaller and smaller (micro or nano-emulsions). If droplets are sufficiently small, the force of gravity acting on them is lower than thermal fluctuations or subtle mechanical agitation forces. In this case, the emulsion can become stable almost indefinitely.

Emulsifiers were also needed, in higher amounts, in order to incorporate more water, which advantageously provides for a further reduction of pollutants in the emissions.

However, addition of high amount of emulsifiers to fuel emulsions to improve stability and to increase water content, besides being particularly expensive, is not devoid of technical drawbacks.

In fact, emulsifiers may cause the formation of carbonaceous deposits adhering to the inner surface of the combustion chamber and of the injection apparatus. These deposits negatively affect engine operation and need to be continuously removed.

It would be thus desirable to have w/o fuel emulsions characterized by a long term shelf-life and reduced emissions and good engine performance. It would even be more desirable to have w/o fuel emulsions containing low amount of surfactants meanwhile offering at least the same or even better stability, water content, engine out-put and pollutant reduction of previous emulsions comprising higher amount of surfactants.

The Applicant has observed that micro-emulsions containing surfactants at low concentration were mentioned in previous patents but generally were not specifically disclosed.

The Applicant has also realized that prior art emulsion compositions with a low content of emulsifiers either were not able to incorporate water in high amount or had a limited stability. Furthermore, these emulsions very often were significantly less performant than diesel oil fuel.

For instance, document EP0958853 discloses a process for producing emulsions of at least two substantially immiscible fluids, particularly emulsions of a liquid fuel with water. Emulsions actually disclosed comprise 2.0-2.5% of surfactants.

Patent Application WO97/34969 describes an emulsion between water and hydrocarbons, for example a Diesel fuel oil. The emulsions reported in the examples are stabilized by addition of about 1.9-2% of an emulsifying composition made essentially of sorbitan sesquioleate, polyethylene glycol monooleate and an ethoxylated nonylphenol, having HLB between 6 and 8.

Patent Application EP812615A1 describes a process for the production of a stabilized emulsion of diesel oil and water. This process provides the preparation of a first emulsion obtained by mixing diesel oil, water and the surfactant, and then the mixing of the so obtained emulsion with more water to produce the final emulsion. The emulsion is prepared by using a hydrophilic or lipophilic surfactant or a mixture thereof in amounts of about 1.2% with respect to the whole emulsion weight.

Patent Application WO 92/19701 discloses emulsions stabilized by addition of alkanolamides. In the preparation of Example 1 the emulsifier oleamide DEA is used in amount of 0.25% by weight and the emulsion is said to be stable for two hours under static conditions.

There is still the need of surfactant compositions for water in diesel oil micro-emulsions that, even with a lower content of surfactants, are still able to provide very stable fuel micro-emulsions, possibly comprising water also in high amount and with combustion performance comparable with diesel oil fuel alone.

The Applicant has surprisingly found a specific emulsifying composition for water in diesel oil micro-emulsions, composition which provides for homogeneous water in diesel oil fuel micro-emulsions, with excellent shelf-life and engine out-put, even with a high water content, which is also effective when low amount of surfactants are used.

SUMMARY

It is thus a first object of the present invention an emulsifying composition (c) for water in diesel oil fuel micro-emulsions comprising:
1) from 20.0 to 33.0% by weight of at least a non-ionic polymer selected among polyglycerides of mono-, di- and tri-glycerides of fatty acids, polyethylene glycols, polyvinyl alcohols, polyvinylpyrrolydone (PVP), vinylpyrrolidone (VP)/vinyl acetate (VA) copolymers, vinyl methacrylate (VMA)/acrylamide (AM) copolymers, ethyl-, ethylmethyl-, ethylhydroxy-, hydroxyl-, methyl-, hydroxypropyl-cellulose, natural gums—such as karaya gum, tragacanth gum, carob bean gum—and admixtures thereof;
2) from 6.0 to 10.0% by weight of at least a lipophilic non-ionic surfactant, having HLB lower than 7;
3) from 16.0 to 29.0% by weight of at least a hydrophilic non-ionic surfactant having HLB higher than 10;
4) from 6.5 to 11.5% by weight of at least an anionic surfactant selected among organic sulfates, sulfonates, phosphates and carboxylates salts;
5) from 9.5 to 16.5% by weight of at least an amphoteric surfactant.

It is a second object of the present invention a micro-emulsion of water in diesel oil comprising at least
a) from 5.0 to 30.0% by weight of water,
b) from 95.0 to 70.0% by weight of a diesel oil, and
c) the emulsifying composition according to the first object, preferably in amount of at most 3.0% by weight.

It is a third object of the present invention a process for the manufacture of a water in diesel oil fuel micro-emulsion comprising:
I. providing a diesel oil (b) in amount from 95.0 to 70.0% by weight with respect to the total weight of the final micro-emulsion;
II. adding to the diesel oil (b) an emulsifying composition (c) according to the first object of the present invention, preferably in amount of at most 3.0% by weight with respect to the total weight of the final micro-emulsion;
III. optionally pre-mixing the emulsifying composition (c) and the diesel oil (b) up to an admixture (d) is obtained,
IV. adding from 5.0 to 30.0% by weight with respect to the total weight of the final micro-emulsion of water (a), preferably by spraying;
V. passing the admixture of (a), (b) and (c) at least once through a mixing device, and
VI. optionally, recirculating the final admixture through the mixing device, up to the micro-emulsion is obtained.

It is a fourth object of the present invention the use of the present micro-emulsion of water in diesel oil according to the second object as fuel, preferably as fuel for automotive or for heating applications.

DEFINITIONS

With the terms "Diesel oil" or "Diesel fuel" any liquid fuel used in diesel engines, whose fuel ignition takes place as a result of compression of the inlet air mixture is meant.

With the term "HLB" hydrophilic-lipophilic balance is meant. HLB is an empirical value based on the relative percentage of the hydrophilic to the lipophilic moieties in a surfactant molecule and it has an arbitrary scale of 1-18.

With the sentence "absence of a visible separated aqueous phase" it is meant that after centrifugation according to UNICHIM MU 1548 of the micro-emulsion, there is no separated water visible with the naked eye at the bottom of the test tube.

With the term "Span" a sorbitan alkyl ester is meant

With the term "Tween" a polyethoxylated sorbitan alkyl ester is meant.

DETAILED DESCRIPTION

The first object of the present invention is an emulsifying composition (c) for water in diesel oil fuel micro-emulsions comprising:
1) from 20.0 to 33.0% by weight of at least a non-ionic polymer selected among polyglycerides of mono-, di- and tri-glycerides of fatty acids, polyethylene glycols, polyvinyl alcohols, polyvinylpyrrolydone (PVP), vinylpyrrolidone (VP)/vinyl acetate (VA) copolymers, vinyl methacrylate (VMA)/acrylamide (AM) copolymers, ethyl-, ethylmethyl-, ethylhydroxy-, hydroxyl-, methyl-, hydroxypropyl-cellulose, natural gums—such as karaya gum, tragacanth gum, carob bean gum—and admixtures thereof;
2) from 6.0 to 10.0% by weight of at least a lipophilic non-ionic surfactant, having HLB lower than 7;
3) from 16.0 to 29.0% by weight of at least a hydrophilic non-ionic surfactant having HLB higher than 10;
4) from 6.5 to 11.5% by weight of at least an anionic surfactant selected among organic sulfates, sulfonates, phosphates and carboxylates salts;
5) from 9.5 to 16.5% by weight of at least an amphoteric surfactant Preferably, the present emulsifying composition is characterized by an overall HLB value from 2.9 to 3.5, preferably from 3.0 to 3.3.

Preferably, one or more of the following features taken alone or in combination, characterize the emulsifying composition of the present invention.

The percentages by weight of the emulsifying composition components are referred to the total weight of the emulsifying composition.

The emulsifying composition according to the present invention comprises at least:
1) from 20.0 to 33.0% by weight of at least a non-ionic polymer selected among polyglycerides of mono-, di- and tri-glycerides of fatty acids, polyethylene glycols, polyvinyl alcohols, polyvinylpyrrolydone (PVP), vinylpyrrolidone (VP)/vinyl acetate (VA) copolymers, vinyl methacrylate (VMA)/acrylamide (AM) copolymers, ethyl-, ethylmethyl-, ethylhydroxy-, hydroxyl-, methyl-, hydroxypropyl-cellulose, natural gums—such as karaya gum, tragacanth gum, carob bean gum—and admixtures thereof.

Preferably, the non-ionic polymer is selected among polyglycerides of mono-, di- and tri-glycerides of C14-C24 fatty acids, more preferably polyglycerides of oleic, linoleic, linolenic fatty acids, more preferably polyglycerides of oleic acid.

Preferably, the amount of the non-ionic polymer is from 22.5 to 27.5% by weight, more preferably from 24.0 to 26.0%.
2) from 6.0 to 10.0% by weight of at least a lipophilic non-ionic surfactant, having HLB lower than 7. Preferably, the lipophilic non-ionic surfactant is selected among sorbitan alkyl esters (Spans), fatty alcohols and their polyethoxylated deriatives, polyethoxylated fatty acid esters, glycerol esters and their admixtures, more preferably selected among sorbitan alkyl esters.

Preferably, the amount of the lipophilic non-ionic surfactant is from 6.7 to 8.2% by weight, more preferably from 7.0 to 8.0% by weight.

Preferably the lipophilic non-ionic surfactant has a HLB lower than 5, more preferably lower than 3.

Preferably the lipophilic non-ionic surfactant has a HLB higher than 1.5, preferably higher than 2.0.
3) from 16.0 to 29.0% by weight of at least a hydrophilic non-ionic surfactant having HLB higher than 10.

Preferably, the hydrophilic non-ionic surfactant is selected among polyoxyethlyene derivatives of sorbitan alkyl esters (Tweens), ethoxylated fatty alcohol, polyethoxylated fatty acid esters, glycerol esters and their admixtures, more preferably selected among polyoxyethlyene derivatives of sorbitan alkyl esters (Tweens).

Preferably, the amount of the hydrophilic non-ionic surfactant is from 19.0 to 23.0% by weight, more preferably from 20.0 to 22.0% by weight.

Preferably, the lipophilic non-ionic surfactant has a HLB higher than 10.5.

Preferably, the lipophilic non-ionic surfactant has a HLB lower than 12.0, preferably between 10.5 and 11.5.
4) from 6.5 to 11.5% by weight of at least an anionic surfactant selected among organic sulfates, sulfonates, phosphates and carboxylates salts, and their admixtures, preferably alkyl sulfates, more preferably lauryl sulfate salts.

Preferably sulfates, sulfonates, phosphates and carboxylates salts are alkaline or earth-alkaline salts.

Preferably the amount of the anionic surfactant is from 7.5 to 9.0% by weight, more preferably from 8.0 to 8.5% by weight.
5) from 9.5 to 16.5% by weight of at least an amphoteric surfactant, preferably selected among amphoteric surfactants bearing as cations primary, secondary, tertiary amines or quaternary ammonium salts, and as anions sulfonates, phosphates, carboxylates and their combinations such as sultaines, betaines, phospholipids with a quaternary ammonium group and their admixtures.

Preferably, the amphoteric surfactant is selected among phospholipids with a quaternary ammonium group such as phosphatidylcholine or lecitine, and their admixtures.

Preferably, the amount of the amphoteric surfactant is from 10.0 to 15.0%, more preferably from 11.0 to 13.0%, from 12.0 to 12.5% by weight.

The emulsifying composition may further comprise one or more additives commonly used in the field of water in oil fuel micro-emulsions, such as for instance stabilizers, anti-freezing agents, octane boosters, lubricants, anti-foam, anti-corrosion agents, adjuvants and others.

In particular, the present emulsifying composition preferably further comprises one or more of the following additives:
6) a lubricant selected among fatty acids, fatty alcohols and fatty esters and their admixtures. Preferably, the lubricant is liquid at room temperature. Preferably, the lubricant is selected among fatty acids, more preferably is erucic acid. The amount of lubricant can be suitably tailored in view of the presence of lubricants in the diesel oil, preferably in amount from 3 to 13% by weight;
7) an octane booster preferably selected between 2-ethyl-hexyl nitrate and tert-butyl alcohol, preferably tert-butyl alcohol, preferably in amount from 1.0 to 3.0% by weight;
8) an anti-freezing agent selected among organic solvents such as 1,3-dioxolane, Tetrahydrofurane, diclorobenzyl alcohol and 1,2-dimethoxy ethane, ethylene glycol, propylene glycol, glycerol and their admixtures, preferably in amount from 2.0 to 5.0% by weight;

9) an emulsion stabilizer such as sodium carboxymethyl cellulose, preferably in amount from 2.0 to 7.0% by weight;
10) an antifoam agent such as a polydimethylsiloxane and other silicone derivatives, or tributyl triphosphate, preferably tributyl triphosphate, preferably in amount from 1.0 to 4.0% by weight;
11) an adjuvant agent such as silica preferably in amount from 0.5-4.0% by weight.

The above percentage by weight of the optional additives 6 to 11 are referred to the weight of the emulsifying composition.

In one embodiment, the present emulsifying composition comprises at least:
1) from 24.0% to 26.0% by weight of polyglycerides of mono-, di- and tri-glycerides of oleic, linoleic, linolenic fatty acids, more preferably polyglycerides of oleic acid.
2) from 7.0 to 8.0% by weight of at least a lipophilic non-ionic surfactant, selected among sorbitan alkyl esters (Spans), having HLB lower than 7, preferably HLB lower than 5, more preferably HLB lower than 3.
3) from 20.0 to 22.0% by weight of at least a hydrophilic non-ionic surfactant selected among polyoxyethlyene derivatives of sorbitan alkyl esters (Tweens), having HLB higher than 10, preferably higher than 10.5
4) from 8.0 to 8.5% by weight of at least an anionic surfactant selected among alkyl sulfates salts, more preferably lauryl sulfate salts.
5) from 11.0 to 13% by weight of at least an amphoteric surfactant, selected among phospholipids with a quaternary ammonium group such as phosphatidylcholine or lecitine, and their admixtures; and, optionally, one or more of the additives previously listed under numbers 6 to 11.

In one embodiment, the present emulsifying composition comprises at least:
1) from 24.0% to 26.0% by weight of polyglycerides of mono-, di- and tri-glycerides of oleic, linoleic, linolenic fatty acids, more preferably polyglycerides of oleic acid.
2) from 7.0 to 8.0% by weight of at least a lipophilic non-ionic surfactant, selected among sorbitan alkyl esters (Spans), having HLB lower than 7, preferably HLB lower than 5, more preferably HLB lower than 3.
3) from 20.0 to 22.0% by weight of at least a hydrophilic non-ionic surfactant selected among polyoxyethlyene derivatives of sorbitan alkyl esters (Tweens), having HLB higher than 10, preferably higher than 10.5
4) from 8.0 to 8.5% by weight of at least an anionic surfactant selected among alkyl sulfates salts, more preferably lauryl sulfate salts.
5) from 11.0 to 13% by weight of at least an amphoteric surfactant, selected among phospholipids with a quaternary ammonium group such as phosphatidylcholine or lecitine, and their admixtures;
6) from 10 to 13% by weight of a lubricant selected among fatty acids, fatty alcohols and fatty esters and their admixtures, and
optionally, one or more of the additives previously listed under numbers 7 to 11.

In one embodiment, the present emulsifying composition comprises:
1) from 24.5 to 25.1% by weight of a non-ionic polymer selected among polyglycerides of mono-, di- and tri-glycerides of fatty acids, polyethylene glycols, polyvinyl alcohols, polyvinylpyrrolydone (PVP), vinylpyrrolidone (VP)/vinyl acetate (VA) copolymers, vinyl methacrylate (VMA)/acrylamide (AM) copolymers, ethyl-, ethylmethyl-, ethylhydroxy-, hydroxyl-, methyl-, hydroxypropyl-cellulose, natural gums—such as karaya gum, tragacanth gum, carob bean gum—and admixtures thereof;
2) from 7.2 to 7.8% by weight of at least a lipophilic non-ionic surfactant, having HLB lower than 7. Preferably, the lipophilic non-ionic surfactant is selected among sorbitan alkyl esters (Spans), fatty alcohols and their admixtures, more preferably selected among sorbitan alkyl esters;
3) from 20.5 to 21.5% by weight of at least a hydrophilic non-ionic surfactant having HLB higher than 10. Preferably, the hydrophilic non-ionic surfactant is selected among polyoxyethlyene derivatives of sorbitan alkyl esters (Tweens), polyethoxylated fatty acid esters, glycerol esters and their admixtures, more preferably selected among polyoxyethlyene derivatives of sorbitan alkyl esters (Tweens).
4) from 8.0 to 8.5% by weight of at least an anionic surfactant selected among organic sulfates, sulfonates, phosphates and carboxylates salts, and their admixtures, preferably alkyl sulfates, more preferably lauryl sulfate salts.
5) from 12.0 to 12.5% by weight of at least an amphoteric surfactant, preferably selected among amphoteric surfactants bearing as cations protonated primary, secondary, tertiary amines or quaternary ammonium salts, and as anions sulfonates, phosphates, carboxylates and their combinations such as sultaines, betaines, phospholipids with a quaternary ammonium group and their admixtures. Preferably, the amphoteric surfactant is selected among phospholipids with a quaternary ammonium group such as phosphatidylcholine or lecitine, and their admixtures;
and, optionally, one or more of the additives previously listed under numbers 6 to 11.

In one embodiment, the present emulsifying composition comprises:
1) from 24.5 to 25.1% by weight of polyglycerides of oleic acid as non-ionic polymer;
2) from 7.2 to 7.8% by weight of sorbitan tristearate lipophilic non-ionic surfactant;
3) from 20.5 to 21.5% by weight of Polyoxyethylenesorbitan Trioleate as hydrophilic non-ionic surfactant;
4) from 8.0 to 8.6% by weight of sodium lauryl sulfate as anionic surfactant.
5) from 12.0 to 12.5% by weight of phosphatidylcholine or lecitine, and their admixtures as amphoteric surfactant;
and, optionally, one or more of the additives previously listed under numbers 6 to 11.

In one embodiment, the present emulsifying composition comprises:
1) from 24.5 to 25.1% by weight of a non-ionic polymer selected among polyglycerides of mono-, di- and tri-glycerides of fatty acids, polyethylene glycols, polyvinyl alcohols, polyvinylpyrrolydone (PVP), vinylpyrrolidone (VP)/vinyl acetate (VA) copolymers, vinyl methacrylate (VMA)/acrylamide (AM) copolymers, ethyl-, ethylmethyl-, ethylhydroxy-, hydroxyl-, methyl-, hydroxypropyl-cellulose, natural gums—such as karaya gum, tragacanth gum, carob bean gum—and admixtures thereof;
2) from 7.2 to 7.8% by weight of at least a lipophilic non-ionic surfactant, having HLB lower than 7. Preferably, the lipophilic non-ionic surfactant is selected among sorbitan alkyl esters (Spans), fatty alcohols and their polyethoxylated deriatives, polyethoxylated fatty acid esters, glycerol esters and their admixtures, more preferably selected among sorbitan alkyl esters;
3) from 20.5 to 21.5% by weight of at least a hydrophilic non-ionic surfactant having HLB higher than 10. Preferably, the hydrophilic non-ionic surfactant is selected among polyoxyethlyene derivatives of sorbitan alkyl esters (Tweens), ethoxylated fatty alcohol, polyethoxylated fatty acid esters, glycerol esters and their admixtures, more preferably selected among polyoxyethlyene derivatives of sorbitan alkyl esters (Tweens);
4) from 8.0 to 8.5% by weight of at least an anionic surfactant selected among organic sulfates, sulfonates, phosphates and carboxylates salts, and their admixtures, preferably alkyl sulfates, more preferably lauryl sulfate salts.
5) from 12.0 to 12.5% by weight of at least an amphoteric surfactant, preferably selected among amphoteric surfactants bearing as cations protonated primary, secondary, tertiary amines or quaternary ammonium salts, and as anions sulfonates, phosphates, carboxylates and their combinations such as sultaines, betaines, phospholipids with a quaternary ammonium group and their admixtures. Preferably, the amphoteric surfactant is selected among phospholipids with a quaternary ammonium group such as phosphatidylcholine or lecitine, and their admixture;
6) from 11.0 to 12.5% by weight of a lubricant selected among liquid fatty acids, fatty alcohols and fatty esters and their admixtures, preferably is erucic acid;
7) from 1.8 to 2.2% by weight of an octane selected between 2-ethylhexyl nitrate and tert-butyl alcohol, preferably is tert-butyl alcohol;
8) from 3.0 to 4.0% by weight of an anti-freezing agent selected among organic solvents such as 1,3-dioxolane, Tetrahydrofurane, diclorobenzyl alcohol and 1,2-dimethoxy ethane, ethylene glycol, propylene glycol, glycerol and their admixtures;
9) from 4.0 to 5.5% by weight of an emulsion stabilizer, preferably of sodium carboxymethyl cellulose;
10) from 2.1 to 2.3% by weight of an antifoam agent, preferably of tributyl triphosphate;
11) from 1.5 to 2.2% by weight of an adjuvant agent, preferably of silica.

In a preferred embodiment, the present emulsifying composition comprises:
1) from 24.5 to 25.1% by weight of polyglycerides of oleic acid as non-ionic polymer;
2) from 7.2 to 7.8% by weight of sorbitan tristearate as lipophilic non-ionic surfactant;
3) from 20.5 to 21.5% by weight of Polyoxyethylenesorbitan Trioleate as hydrophilic non-ionic surfactant;
4) from 8.0 to 8.5% by weight of sodium lauryl sulfate as anionic surfactant;
5) from 12.0 to 12.5% by weight of phosphatidylcholine or lecitine, and their admixtures as amphoteric surfactant;
6) from 11.0 to 12.5% by weight of erucic acid as lubricant;
7) from 1.8 to 2.2% by weight of tert-butyl alcohol as octane booster;
8) from 3.0 to 4.0% by weight of an admixture of organic solvents as anti-freezing agent, preferably of 1,3-dioxolane, tetrahydrofurane, diclorobenzyl alcohol and 1,2-dimethoxy ethane;
9) from 4.0 to 5.5% by weight of sodium carboxymethyl cellulose as emulsion stabilizer;
10) from 2.1 to 2.3% by weight of tributyl triphosphate as antifoam agent;
11) from 1.5 to 2.2% by weight of silica as adjuvant.

In a preferred embodiment, the present emulsifying composition (c) consists of:
1) from 20.0 to 33.0% by weight of at least a non-ionic polymer selected among polyglycerides of mono-, di- and tri-glycerides of fatty acids, polyethylene glycols, polyvinyl alcohols, polyvinylpyrrolydone (PVP), vinylpyrrolidone (VP)/vinyl acetate (VA) copolymers, vinyl methacrylate (VMA)/acrylamide (AM) copolymers, ethyl-, ethylmethyl-, ethylhydroxy-, hydroxyl-, methyl-, hydroxypropyl-cellulose, natural gums—such as karaya gum, tragacanth gum, carob bean gum—and admixtures thereof;
2) from 6.0 to 10.0% by weight of at least a lipophilic non-ionic surfactant, having HLB lower than 7;
3) from 16.0 to 29.0% by weight of at least a hydrophilic non-ionic surfactant having HLB higher than 10;
4) from 6.5 to 11.5% by weight of at least an anionic surfactant selected among organic sulfates, sulfonates, phosphates and carboxylates salts;
5) from 9.5 to 16.5% by weight of at least an amphoteric surfactant.
and, optionally, one or more of the additives previously listed under numbers 6 to 11.

In a preferred embodiment, the present emulsifying composition consists of:
1) from 24.5 to 25.1% by weight of a non-ionic polymer selected among polyglycerides of mono-, di- and tri-glycerides of fatty acids, polyethylene glycols, polyvinyl alcohols, polyvinylpyrrolydone (PVP), vinylpyrrolidone (VP)/vinyl acetate (VA) copolymers, vinyl methacrylate (VMA)/acrylamide (AM) copolymers, ethyl-, ethylmethyl-, ethylhydroxy-, hydroxyl-, methyl-, hydroxypropyl-cellulose, natural gums—such as karaya gum, tragacanth gum, carob bean gum—and admixtures thereof;
2) from 7.2 to 7.8% by weight of at least a lipophilic non-ionic surfactant, having HLB lower than 7. Preferably, the lipophilic non-ionic surfactant is selected among sorbitan alkyl esters (Spans), fatty alcohols and their admixtures, more preferably selected among sorbitan alkyl esters;
3) from 20.5 to 21.5% by weight of at least a hydrophilic non-ionic surfactant having HLB higher than 10. Preferably, the hydrophilic non-ionic surfactant is selected among polyoxyethlyene derivatives of sorbitan alkyl esters (Tweens), polyethoxylated fatty acid esters, glycerol esters and their admixtures, more preferably selected among polyoxyethylene derivatives of sorbitan alkyl esters (Tweens).
4) from 8.0 to 8.5% by weight of at least an anionic surfactant selected among organic sulfates, sulfonates, phosphates and carboxylates salts, and their admixtures, preferably alkyl sulfates, more preferably lauryl sulfate salts.
5) from 12.0 to 12.5% by weight of at least an amphoteric surfactant, preferably selected among amphoteric surfactants bearing as cations protonated primary, secondary, tertiary amines or quaternary ammonium salts, and as anions sulfonates, phosphates, carboxylates and their combinations such as sultaines, betaines, phospholipids with a quaternary ammonium group and their admixtures. Preferably, the amphoteric surfactant is selected among phospholipids with a quaternary ammonium group such as phosphatidylcholine or lecitine, and their admixtures;
and one or more of the additives previously listed under numbers 6 to 11.

In one embodiment, the present emulsifying composition consists of:
1) from 24.5 to 25.1% by weight of polyglycerides of oleic acid as non-ionic polymer;
2) from 7.2 to 7.8% by weight of sorbitan tristearate as lipophilic non-ionic surfactant;
3) from 20.5 to 21.5% by weight of Polyoxyethylenesorbitan Trioleate as hydrophilic non-ionic surfactant;
4) from 8.0 to 8.6% by weight of sodium lauryl sulfate as anionic surfactant;
5) from 12.0 to 12.5% by weight of phosphatidylcholine or lecitine, and their admixtures as amphoteric surfactant;
and one or more of the additives previously listed under numbers 6 to 11.

In a preferred embodiment, the present emulsifying composition consists of:
1) from 24.5 to 25.1% by weight of polyglycerides of oleic acid as non-ionic polymer;
2) from 7.2 to 7.8% by weight of sorbitan tristearate as lipophilic non-ionic surfactant;
3) from 20.5 to 21.5% by weight of Polyoxyethylenesorbitan Trioleate as hydrophilic non-ionic surfactant;
4) from 8.0 to 8.5% by weight of sodium lauryl sulfate as anionic surfactant.
5) from 12.0 to 12.5% by weight of phosphatidylcholine or lecitine, and their admixtures as amphoteric surfactant;
6) from 11.0 to 12.5% by weight of erucic acid as lubricant;
7) from 1.8 to 2.2% by weight of tert-butyl alcohol as octane booster;
8) from 3.0 to 4.0% by weight of admixture of organic solvents as anti-freezing agent, preferably 1,3-dioxolane, tetrahydrofurane, diclorobenzyl alcohol and 1,2-dimethoxy ethane;
9) from 4.0 to 5.5% by weight of sodium carboxymethyl cellulose as emulsion stabilizer;
10) from 2.1 to 2.3% by weight of tributyl triphosphate as antifoam agent;
11) from 1.5 to 2.2% by weight of silica as adjuvant.

Advantageously the present emulsifying composition can be used to emulsify different diesel oil types such as for instance automotive diesel oil, farm diesel oil and heating diesel oil.

The present emulsifying composition may be manufactured by admixing all the ingredients or, preferably, by dispersing the octane booster in the non-ionic polymer, followed by the addition of all the other components under stirring at room temperature up to an homogeneous admixture is obtained.

The present emulsifying composition may be advantageously used for manufacturing a very stable, high water-content fuel micro-emulsion.

Preferably, the present emulsifying composition is used in amount of at most 3.0%, at most 2.0%, at most 1.5%, at most 1% by weight with respect to the total weight of the final micro-emulsion.

The second object of the present invention is a micro-emulsion of water in diesel oil comprising at least
a) from 5.0 to 30.0% by weight of water,
b) from 95.0 to 70.0% by weight of a diesel oil, and
c) the emulsifying composition according to the first object, preferably in amount of at most 3.0% by weight.

The percentages by weight of the above components (a), (b) and (c) are referred to the total weight of the final micro-emulsion.

The micro-emulsion according to the present invention, may be characterized by one or more of the following features, taken alone or in combination.

The present micro-emulsion comprises at least 5%, preferable at least 8%, more preferably at least 10% by weight of water.

The present micro-emulsion comprises at most 30%, preferable at most 25%, more preferably at most 22% by weight of water.

Preferably, the present micro-emulsion comprises from 5 to 30%, more preferably from 8 to 22% of water.

Preferably, the present micro-emulsion for use as fuel for automotive comprises from 8% to 15%, preferably from 9 to 13% by weight of water.

Preferably, the present micro-emulsion for use as fuel for heating applications comprises from 15 to 22%, preferably from 18% to 21% of water.

Water (a) can be any type of purified water such as distilled, deionized or demineralized water, preferably is a demineralized water, more preferably demineralized water with a very low conductivity, e.g. a conductivity not higher than 30 pS/m.

The present micro-emulsion comprises from 70 to 95%, preferably from 78 to 92% of a diesel oil (b). Diesel oil (b) may be any hydrocarbon admixture including paraffins, aliphatic hydrocarbons and cyclic hydrocarbons, derived from fractional distillation of petroleum (petroldiesel). Generally, diesel oils have boiling points ranging from about 170° C. to about 390° C. In alternative, synthetic diesel not derived from petroleum such as biodiesel, biomass to liquid (BTL), gas to liquid (GTL) and coal to liquid (CTL) may be used. Diesel oils are suitable to fuel diesel engines.

Advantageously, the present micro-emulsion has a lower content of emulsifiers with respect to prior fuel micro-emulsions, on equal or even better stability.

The present micro-emulsion may comprise higher amount e.g. up to 5% by weight or more of the emulsifying composition, However, it preferably comprises at most 3.0%, preferably at most 2.0%, more preferably at most 1.5%, even more preferably at most 1.0%, by weight of the emulsifying composition.

Preferably, the micro-emulsion according to the present invention comprises emulsifiers, preferably the emulsifiers previously numbered from 2 to 5 in the emulsifying composition, in a total amount of at most 1.3%, of at most 1.0%, more preferably of at most 0.8%, even more preferably of at most 0.5% by weight with respect to the total weight of the final micro-emulsion.

In the present micro-emulsion, the percentage by weight of the sum of emulsifiers 2 to 5 as described above preferably ranges from 0.2% to 1.3%, from 0.3 to 1.0%, more preferably from 0.3 to 0.8% by weight.

The micro-emulsion according to the present invention appears as a milky uniform emulsion.

The admixture of surfactants present in the emulsifying composition, at concentrations higher than the critical micelle concentration, gives rise to classic inverse micelles made of non-polar and lipophilic tails oriented outwards, i.e., towards the non-polar continuous phase made of diesel oil, and the polar heads oriented inwards, thus defining an hydrophilic core containing the aqueous dispersed polar phase.

One or more of the following features characterize the micro-emulsion according to the present invention:
i) an interfacial tension lower than 0.03 µN/m, preferably lower than 0.01 µN/m and/or
ii) particles radius lower than 1 µm, preferably lower than 0.9 µm and/or
iii) a sediment lower than 1% and no visible free water after centrifugation according to UNICHIM MU 1548.

The interfacial tension in the present micro-emulsion is particularly low, preferably lower than 0.03 µN/m, preferably lower than 0.01 µN/m, measured according to Donnan's pipette method or drop weight method.

The particle radius is lower than 1 µm, preferably lower than 0.9 µm, evaluated by examination under optical microscope.

The stability test according to UNICHIM MU 1548 evaluates the formation of a sediment by centrifugation according to a scale from 0 to 9 (from 0% to 9% by volume) and the separation of a visible aqueous layer (test score: passed if no separated water is detected; failed if at least a droplet of water is visible).

The score of the present micro-emulsions in this test is a sediment below 1% and a "passed" score as no aqueous droplet was visible.

The present micro-emulsion of water in diesel oil, especially when prepared according to the present process and even when comprising very low amounts of surfactants, shows long term stability under static conditions: for instance if left in a tank, without stirring for at least 4 months or more, no separation of aqueous phase is recordable. Furthermore, no aqueous phase separates under centrifugation (dynamic stability) according to UNICHIM 1548 test method.

With emulsion stables over time, it is intended that the water colloidal particles present in the diesel oil, are and remain uniformly dispersed in the continuous phase, for a period substantially longer with respect to the already known emulsions, even without any stirring. Furthermore, the present micro-emulsions not only do not separate when stored in a tank without any stirring after long storage periods, but also they do not coalesce under dynamic stability tests. The present micro-emulsions are thermodynamically very stable.

These stability characteristics are essential in case of emulsions to be used to supply diesel engines, for which a storage period is expected during production (for example in large tanks), during shipping and distribution (for example in tank trucks and in depots of distribution facilities) and during final use (in the tanks of motor vehicles).

In fact, the present micro-emulsions remain stable and score the maximum grade in the rather demanding test such UNICHIM MU 1548: even after prolonged centrifugation, a sediment lower than 1% and no visible free water have resulted.

The micro-emulsions according to the present invention show several advantages such as:
- excellent long term stability and increased shelf-life (no water separation in the tank);
- reduction of formation and emission of pollutants (NOx, particulate etc);
- reduction of carbonaceous deposits in the combustion chamber and in the injection apparatus;
- increase of calorific yield of the combustion process (improved combustion efficiency with engine performance comparable to diesel oil alone);
- high content of water;
- no engine modification required;
- lower costs of the production equipment;

Additional advantages of the present micro-emulsion are for instance:
- do not require additional lubricants in the combustion chamber (self-lubricant composition);
- reduction of corrosion and freezing events;
- versatility as a single type of emulsifying composition can be used to emulsify different oil types;
- lower costs, as the emulsifying agents may be used in very low amounts.

The micro-emulsion according to the present invention may be manufactured by pre-dispersing the emulsifying composition in the diesel oil and, afterwards, by mixing this first dispersion with water according to conventional techniques.

It is a third object of the present invention a process for the manufacture of a micro-emulsion of water in diesel oil according to the second object comprising:
I. providing a diesel oil (b) in amount from 95.0 to 70.0% by weight with respect to the total weight of the final micro-emulsion;
II. adding to the diesel oil (b) the emulsifying composition (c) according to the first object, preferably in amount of at most 3.0% by weight with respect to the total weight of the final micro-emulsion;
III. optionally pre-mixing the emulsifying composition (c) and the diesel oil (b) up to an admixture (d) is obtained;
IV. adding from 5.0 to 30.0% by weight with respect to the total weight of the final micro-emulsion of water (a), preferably by spraying;
V. passing the admixture of (a), (b) and (c) at least once through a mixing device, and
VI. optionally recirculating the admixture through the mixing device, up to the micro-emulsion is obtained.

Preferably, the process is a batch process.

Accordingly, a batch process for preparing the present water/diesel oil micro-emulsion, comprises:
feeding a predetermined amount of a diesel oil into a mixing tank;
feeding a predetermined amount of the present emulsifying composition into the mixing tank;
feeding a predetermined amount of water into the mixing tank;
recirculating the batch in the mixing tank comprising said diesel oil, said emulsifying composition and said water through a recirculation conduit and through a mixing device;
discharging the fuel micro-emulsion batch.

Preferred apparatus, mixing device and process, for the manufacture of the present micro-emulsion, are described in WO2013/124726 to which we refer in its entirety for further details.

Most preferred apparatus, mixing device and process conditions for manufacturing the present micro-emulsion are disclosed in the co-pending Italian patent application MI2014A001931 in the name of the same Applicant, which is incorporated by reference and to which we refer in its entirety for further details.

A preferred apparatus comprises:
at least one diesel oil feeding unit;
at least one emulsifying composition feeding unit;
at least one water feeding unit;
at least one mixing tank in fluid communication with the diesel oil feeding unit, with the emulsifying composition feeding unit and with the water feeding unit;
a mixing device operatively connected to said mixing tank.

A preferred mixing device comprises:
at least one duct for a flow of liquid, said duct extending along a main direction and presenting an inlet opening and an outlet nozzle;
a cone shaped septum placed in the duct, coaxial with respect to the main direction and tapering towards the outlet nozzle, said cone shaped septum being provided with a plurality of holes made through its conical wall;
a plurality of lamellae arranged in at least a portion of the duct placed downstream of the cone shaped septum, said plurality of lamellae dividing said portion in a plurality of small chambers, wherein said lamellae are provided with through holes; said holes and said small chambers delimiting a labyrinth passageway for the liquid flowing through the duct towards the outlet nozzle.

The co-pending patent application MI2014A001931 provides a detailed description of at least one way of carrying out the present process, along with suitable apparatuses and mixing devices. In particular, a preferred apparatus is described at pages from 15 to 18 and represented in FIG. 1, preferred mixing devices are reported at pages from 18 to 24 and represented in FIGS. 2 to 7 and a preferred process is disclosed at pages from 25 to 28, which are herewith incorporated by reference.

Preferably, recirculation through the mixing device is performed for a number of times comprised between 7 and 11, preferably 9 or 10 times.

The structure of the mixing device disclosed in MI2014A001931 subjects the flow to compression, centrifugation, dispersion and to shear forces and causes the particles to impact against the inner walls of the duct, greatly improving emulsification. These actions are repeated several times during recirculation inside the mixing device and each time the emulsification level improves.

Preferably, before being fed, the diesel oil (b) and/or the water (a) and/or the emulsifying composition (c) are independently passed through auxiliary mixing devices, which incorporate air microbubbles. Incorporation of air microbubbles provides for an easier and more effective emulsification when (b), (c) and, then, (a) are mixed together.

Preferably, the a diesel oil (b), the water (a), the emulsifying composition (c) and the admixture (d) are provided and kept at a temperature from 18 to 25° C., more preferably at about 20-22° C.

This process, due to the peculiar mixing device and especially when the final admixture is recirculated more than once, furnishes high energy to the system and provides for small and finely dispersed water droplets. The resulting micro-emulsion is thus endowed with an excellent stability notwithstanding the relatively low amounts of surfactants therein incorporated.

It is a fourth object of the present invention the use of the present micro-emulsion of water in diesel oil as fuel, preferably as fuel for automotive and for heating applications.

Preferably, the present micro-emulsion for use as fuel for automotive comprises from 8% to 15%, preferably from 9 to 13% of water.

Preferably, the present micro-emulsion for use as fuel for heating in general comprises from 15 to 22%, preferably from 18% to 21% of water.

Using the present micro-emulsions as fuel for diesel engines is particularly advantageous also from the environmental point of view. In fact, the combustion process is particularly clean and efficient, with low emissions and engine high performance.

With the aim to better illustrate the present invention, the following examples are now furnished.

EXAMPLES

Example 1: Preparation of an Emulsifying Composition

An emulsifying composition according to the present invention was prepared with the following ingredients (all percentage by weight):
24.8% polyglycerides of oleic acid
2.0% t-butyl alcohol
21.0% Polyoxyethylenesorbitan Trioleate (Tween® 85, HLB: 11.0)
0.8% 1.3-dioxolane
0.5% tetrahydrofuran
0.9% dichlorobenzyl alcohol
1.8% silica
2.2% tributyl phosphate
7.5% sorbitan tristearate (Span® 65, HLB: 2.1)
3.5% phosphatidylcholine
11.8% erucic acid
4.7% sodium carboxymethyl cellulose
1.5% 1.2-dimethoxyethane
8.3% sodium lauryl sulfate
8.7% lecitine In a mixing tank, Ter-butyl alcohol (2.0 Kg) was added to polyglycerides of oleic acid (24.8 Kg) and stirred at room temperature, up to a homogeneous admixture was obtained. The other components, namely Tween85® (21.0 Kg); 1.3-dioxolane (0.8 Kg); tetrahydrofuran (0.5 Kg); dichlorobenzyl alcohol (0.9 Kg); silica (1.8 Kg); tributyl phosphate (2.2 Kg); Span® 65 (7.5 Kg); phosphatidylcholine (3.5 Kg); erucic acid (11.8 Kg); sodium carboxymethyl cellulose (4.7 Kg); 1.2-dimethoxyethane (1.5 Kg); sodium lauryl sulfate (8.3 Kg); lecitine (8.7 Kg) were then added and kept under stirring at room temperature up to a uniform dispersion was obtained. The emulsifying composition as a honey-like mixture had a HLB of 3.1.

Example 2: Preparation of a Water in Diesel Oil Fuel Micro-Emulsion

A water in diesel oil micro-emulsion according to the present invention was prepared with the following ingredients:
a) 27.1% of demineralized water,
b) 72.2% of diesel oil,
c) 0.7% of the emulsifying composition of Example 1.

The apparatus and the mixing device used for this preparation are illustrated in FIGS. 1 and 2 to 7 and detailed in the corresponding paragraphs of the description of the co-pending patent application MI2014A001931.

The diesel oil (b) (3600 l) was pumped through a first conduit into the mixing tank at a flow rate of about 10 l/s. While pumping the diesel oil, the emulsifying composition (c) of Example 1 (35 l) at a temperature of 20° C. was pumped into the first conduit at a flow rate of about 0.098 l/s. In this way, the diesel oil was pre-mixed with the emulsifying composition.

The pre-mixed diesel oil and emulsifying composition admixture (d) was fed through the mixing device placed along a common conduit just before entering the mixing tank. The mixing tank was filled with the pre-mixed diesel oil and emulsifying composition admixture (d) in about 6 minutes, then 1350 liters of demi-water were added as a fine spray at about 7.5 l/s in about 3 minutes.

At this stage, the overall batch comprising the diesel oil, the emulsifying composition and the demi-water was of about 4985 liters.

The batch was then re-circulated ten times into the mixing tank through a recirculation duct, passing each time through the mixing device, at a flow rate of about 83 l/s, at a pressure of about 120 bar, in about 10 min in total. At the end, the batch was recirculated one time through a bypass conduit without mixing device, at a flow rate of about 2.4 l/s, at a pressure of about 2 bar, in about 35 min and then discharged.

Example 3

Another micro-emulsion according to the invention comprising (a) 12.1% of demi-water, (b) 85.9% of diesel oil and (c) 2.0% of the emulsifying composition of Ex. 1 was prepared with the same procedure described in Example 2.

Micro-emulsion compositions are summarized in the following table 1:

TABLE 1

|  | Ex. 2 | Ex. 3 |
|---|---|---|
| Water (a) | 27.1% | 12.1% |
| Diesel oil (b) | 72.2% | 85.9% |
| Emulsifying composition (c) (ex. 1) | 0.7% | 2.0% |

Static Stability Test

The micro-emulsions according to Examples 2 and 3 were stored in closed transparent vials without stirring, at room temperature, in the dark and visually inspected after 1, 2, 3, 4 and 5 months. No separated water was detectable in anyone of the samples.

Dynamic Stability Test

The w/o micro-emulsions of Examples 2 and 3 according to the present invention were subjected to the stability test as per UNICHIM MU 1548 standard method (w/o emulsions: assessment of free water and stability after centrifugation). This test evaluates emulsion stability in terms of sedimentation (percentage by volume of water-enriched emulsion) and water phase separation at the bottom of the test tube after centrifugation. The maximum score allowed by the current Italian fuel regulations for sedimentation is 9% v/v. All the samples according to the present invention, centrifuged at 4200 crf (centrifugal relative force), for 5 minutes, scored <1% in terms of sedimentation (0.5 ml of sediment) and passed the evaluation of separated visible free water (no free water was detected by visual inspection).

Physico-Chemical Analysis of Micro-Emulsions

Physico-chemical properties of the micro-emulsion of Example 3 were evaluated and collected in the following Table 2:

TABLE 2

| Property | Unit | Result | Test Method |
|---|---|---|---|
| Appearance |  | milky, turbid | SOP 520 |
| Color |  | yellowish | SOP 520 |
| Density at 15° C. | kg/m$^3$ | 853.2 | EN ISO 12185 |
| Micelles size | μm | 0.72 | Optical Microscope |
| Flash point | ° C. | 88 | Grabner |
| Pour point | ° C. | −31 | ISO 3016 |
| Carbon residue | % (m/m) | <0.01 | EN ISO 10370 |
| Water (KF) | % (m/m) | 12.1 | DIN 51777/1 |
| Corrosion on Copper (3 h at 50° C.) |  | 1a | EN ISO 2160 |
| Corrosion on Silver (3 h at 50° C.) |  | 0 | ASTM D 130 mod |
| Ash | % (m/m) | 0.007 | EN ISO 6245 |
| Sulfur | mg/kg | 35.9 | EN ISO 20846 |
| Nitrogen | mg/kg | 42 | ASTM D 4629 |
| Elemental analysis | % (m/m) |  | ASTM D 5291 |
| Carbon |  | 81 |  |
| Hydrogen |  | 13.6 |  |
| Polychlorinated Biphenyls (PCB) | % (m/m) |  | DIN EN 12766-1 |
| PCB 28 |  | <0.5 |  |
| PCB 52 |  | <0.5 |  |
| PCB 101 |  | <0.5 |  |
| PCB 118 |  | <0.5 |  |
| PCB 138 |  | <0.5 |  |
| PCB 153 |  | <0.5 |  |
| PCB 180 |  | <0.5 |  |
| Sum of PCB according to Chem |  | <0.5 |  |
| RRV |  | <20 |  |
| PCB Standardisation |  | no PCB |  |
| ICP with acidic digestion (HNO$_3$/HF) | mg/Kg |  | IS |
| Ag Silver |  | <1 | SOP 613 |
| Al Aluminum |  | 0.3 |  |
| Ba Barium |  | 0.1 |  |
| Ca Calcium |  | 0.2 |  |
| Cd Cadmium |  | <1 |  |
| Cr Chromium |  | <1 |  |
| Cu Copper |  | 0.2 |  |
| Fe Iron |  | 0.4 |  |
| Mg Magnesium |  | 0.2 |  |
| Mn Manganese |  | <1 |  |
| Mo Molybdenum |  | <1 |  |
| Ni Nickel |  | <1 |  |
| P Phosphorus |  | <1 |  |
| Pb Lead |  | <1 |  |
| Si Silicon |  | 0.2 |  |
| Sn Tin |  | <1 |  |
| Ti Titanium |  | <1 |  |
| V Vanadium |  | <1 |  |
| Zn Zinc |  | 11 |  |
| Chlorine |  | <6 | SOP 601 |

As can be seen from the above table, the present micro-emulsions comply with the technical and legal requirements for water in diesel oil emulsions set in the current regulations. In particular they show a correct density, a high flash point and a good pour point (−31° C.) notwithstanding the diesel oil used as continuous phase was a summer oil (pour point −7° C.). Furthermore, notwithstanding the high water content, the micro-emulsion is not corrosive (corrosion on copper 1a, corrosion on silver 0).

Combustion Test

In order to evaluate the quality of the micro-emulsion of the present invention as fuel in combustion processes, test runs were conducted with a Diesel engine. The micro-emulsion tested had the following composition:

14.5% of water 83.8% of diesel oil, and 1.7% of the emulsifying composition (c) of Example 1, and was prepared as described under Example 2.

In particular, both the particle mass in the exhausted gas and the performance of the engine fuelled with the present micro-emulsions were evaluated and compared with those obtained with Diesel oil fuel as such.

Particle Mass Concentration of the Raw Gas (Particulate Matter PM)

Different nanoparticle sensors (Diffusion Size Classifier (DiSC) sensors) were arranged to analyze the exhausts of a vehicle (Ford Transit Connect) equipped with a Diesel engine (4 cylinder engine, cubic capacity 1753 cm$^3$) and Diesel Particle Filter.

In particular DiSC mini "Goldy" and DiSC std "Testo" sensors were connected to a NanoMet dilution and conditioning unit placed directly at the vehicle exhaust for raw gas measurements.

NanoMet system dilutes the raw aerosol and removes volatile particle components, therewith only solid particles are fed to the particle sensors. The sensors set directly at the vehicle exhaust detected the particle concentrations.

Particle number and size measurements were done; these data were used to estimate particle mass concentrations. The following Table 3 shows the particle mass concentration estimation of the raw gas detected by the sensors DiSC mini "Golly" and DiSC std "Testo".

TABLE 3

| | | | Reference diesel fuel | | | Emulsion fuel | | |
|---|---|---|---|---|---|---|---|---|
| Model | device id | sensor position | Cycle 1 | Cycle 2 | Cycle 3 | Cycle 1 | Cycle 2 | Cycle 3 |
| DiSC mini | Goldy | NanoMet | 1.26 | 0.94 | 0.75 | 0.21 | 0.22 | 0.21 |
| DiSC std | Testo | NanoMet | 0.44 | 0.56 | 0.58 | 0.09 | 0.09 | 0.08 |

(Average Mass Concentration [mg/m3]-estimated using spherical particle shape theory)

The total particle mass concentration calculated based on particle number concentration and mean size detected by DiSC sensors is reduced by a factor of about 5 during the cycles run using emulsion fuel compared to the first cycles when the vehicle was fuelled with standard fuel.

In conclusion, significant particle mass reductions were observed when emulsion fuel according to the present invention was used instead of standard Diesel fuel.

Performance of the Engine

The test stand (Tecno EL bench) was equipped with an IVECO Tector Diesel engine (type F4BE0684B*D 402). The engine was first fuelled with conventional diesel oil and then, after complete emptying of the oil loading system, with the water in diesel oil micro-emulsion described above. Engine rounds per minute (rpm), motor torque, real power, corrected power (at full speed), oil and turbine pressures and temperatures were measured when the engine was fuelled first with conventional diesel fuel and then with the present micro-emulsion fuel. Some of these data are collected in the following Tables 4 and 5:

TABLE 4

Diesel fuel

| N. | Rpm | Torque Kgf·m | Real Power CV | Corrected Power CV | Oil pressure Bar | Turbine pressure Bar |
|---|---|---|---|---|---|---|
| 1 | 1949 | 72.3 | 142.1 | 140.3 | 4.20 | 1.149 |
| 2 | 1849 | 75.6 | 139.8 | 138.0 | 4.11 | 1.181 |
| 3 | 1761 | 76.7 | 128.6 | 126.9 | 4.46 | 1.039 |
| 4 | 1624 | 76.9 | 126.8 | 125.1 | 3.93 | 0.880 |
| 5 | 1538 | 76.1 | 120.2 | 118.7 | 3.85 | 0.803 |
| 6 | 1445 | 76.6 | 111.9 | 110.4 | 3.77 | 0.726 |

TABLE 5

Emulsion fuel

| N. | Rpm | Torque Kgf·m | Real Power CV | Corrected Power CV | Oil pressure Bar | Turbine pressure Bar |
|---|---|---|---|---|---|---|
| 1 | 1962 | 67.0 | 131.4 | 129.7 | 6.18 | 1.011 |
| 2 | 1689 | 68.5 | 132.1 | 130.5 | 4.10 | 0.954 |
| 3 | 1739 | 71.6 | 125.0 | 124.2 | 4.01 | 0.858 |
| 4 | 1648 | 70.5 | 117.8 | 116.3 | 3.93 | 0.767 |
| 5 | 1549 | 72.7 | 110.7 | 149.3 | 3.86 | 0.700 |
| 6 | 1494 | 73.0 | 108.9 | 107.6 | 3.77 | 0.635 |

As regards the evaluation of the performance of the engine, the data listed in Tables 4 and 5 show that the loss of torque and power, with respect to Diesel fuel, is in any case negligible (about 1% or even less). This is an excellent result with respect to previous water oil emulsion fuels.

Furthermore, the data reported above support the conclusion that for an equal developed power the engine fueled with the present emulsion burns less Diesel fuel. The decrease in actual consumption of Diesel fuel can be ascribed to an improvement in the efficiency of the thermal combustion process performed by the engine fuelled with the microemulsions of the present invention.

The engine combustion temperatures are lower when the present micro-emulsions are used as fuel, thus resulting in a reduction of noxious pollutants in the exhausted gas.

*Compliance with Specification of w/o fuel emulsions according to Italian Regulations* ('Caratteristiche Tecniche Delle Emulsioni Stabilizzate', published in Gazzetta Ufficiale N. 78, 3 Apr. 2000) Water-diesel emulsions, which comply with the following specification, were eligible for a reduced excise duty rate in Italy. The emulsions were allowed for use in medium- and heavy-duty vehicles. The latest Water-Diesel Fuel Emulsion Specification (CUNA standard NC 637-01 (December 2003) are tabulated below:

TABLE 6

| Fuel Property | Unit | Limit Min | Limit Max | Test |
|---|---|---|---|---|
| Appearance | | Milky | | Visual |
| Density @15° C. | kg/m³ | 835 | 870 | ISO3675, ISO12185 |
| Water content | % m/m | 12.0 | 15.0 | ISO8534 |
| Stability, under centrifugation phase separation | % v/v | (4200 rcf, 5 min)* | 9.0 | UNICHIM MU 1548 |
| free water | | Pass | | |
| Viscosity @40° C. | mm²/s | 2.0 | 7.0 | ISO 3104 |
| Sulfur | % m/m | — | 0.031 | ISO 14596, EN 24260 |
| Sulfated ash | % m/m | — | 0.01 | ISO 3987 |
| Total contaminants | mg/kg | — | 24 | EN 12662 |
| Copper corrosion, 3 h at 50° C. | index | Class 1 | | ISO 2160 |
| Flash Point | ° C. | >55 | — | ISO 2592, UNI EN ISO 22719 |
| Total nitrate content † | mg/kg | 750 | — | ISO 13759 |
| Lubricity (corrected wear scar diameter, wsd 14 mbar at 60° C.) | μm | — | 460 | ISO 12156-1 |
| CFPP ‡ | ° C. | — | Winter: −10 Summer: 0 | EN 116 |

*Sample must be taken immediately upon delivery
† Expressed as 2-ethyl-hexyl-nitrate (EHN)
‡ Antifreeze additives are allowed for winter grade, provided the total water content is unchanged Furthermore, the following requirements apply:
The emulsion must be used within 4 months from delivery
Mixing of emulsions produced with different technologies, or mixing of emulsions with diesel fuel in depots, is not allowed Diesel fuel used for emulsions must conform to UNI EN 590:2000

For the preparation of emulsion de-ionized water must be used with maximum conductivity of 30 μS/cm Emulsifiers and additives must not contain compounds of fluorine, chlorine, or heavy metals The micro-emulsions according to the present invention comply with the above specifications.

The invention claimed is:

1. Emulsifying composition for water in diesel oil fuel micro-emulsions comprising:
   from about 20.0% to about 33.0% by weight of at least a non ionic polymer, selected among polyglycerides of mono-, di- and tri-glycerides of fatty acids;
   from about 6.0% to about 10.0% by weight of at least a lipophilic non-ionic surfactant, having HLB lower than about 7 selected among sorbitan alkyl esters (Spans), fatty alcohols and their polyethoxylated derivatives, polyethoxylated fatty acid esters, glycerol esters and their admixtures;
from about 16.0% to about 29.0% by weight of at least a hydrophilic non-ionic surfactant having HLB higher than about 10 selected among polyoxyethylene derivatives of sorbitan alkyl esters (Tweens), ethoxylated fatty alcohol, polyethoxylated fatty acid esters, glycerol esters and their admixtures;
   from about 6.5% to about 11.5% by weight of at least an anionic surfactant selected among organic sulfates, sulfonates, phosphates and carboxylates salts; and
   from about 9.5% to about 16.5% by weight of at least an amphoteric surfactant.

2. The emulsifying composition according to claim 1 comprising:
   from about 22.5% to about 27.5% by weight of the non ionic polymer
   from about 6.7% to about 8.2% by weight of the lipophilic non-ionic surfactant;
   from about 19.0% to about 23.0% by weight of the hydrophilic non-ionic surfactant;
   from about 7.5% to about 9.0% by weight of the anionic surfactant; and
   from about 10.0% to about 15.0% by weight of the amphoteric surfactant.

3. The emulsifying composition according to claim 1, wherein
   the non-ionic polymer is selected among polyglycerides of mono-, di- and tri-glycerides of fatty acids;
   the lipophilic non-ionic surfactant, having HLB lower than about 7 is selected among sorbitan alkyl esters;
   the hydrophilic non-ionic surfactant having HLB higher than about 10 is selected among polyoxyethlyene derivatives of sorbitan alkyl esters (Tweens);
   the anionic surfactant is selected among organic sulfates, sulfonates, phosphates and carboxylates salts, and their admixtures; and
   the amphoteric surfactant is selected among phospholipids with a quaternary ammonium group, and their admixtures.

4. The emulsifying composition according to claim 1, further comprising one or more of the following additives:
   a lubricant selected among fatty acids, fatty alcohols and fatty esters and their admixtures in amount from about 3% to about 13% by weight;
   an octane booster selected between 2-ethylhexyl nitrate and tert-butyl alcohol, in amount from about 1.0% to about 3.0% by weight;
   an anti-freezing agent selected among organic solvents, in amount from about 2.0% to about 5.0% by weight;
   an emulsion stabilizer, in amount from about 2.0% to about 7.0% by weight;
   an antifoam agent, in amount from about 1.0% to about 4.0% by weight; and
   an adjuvant agent in amount from about 0.5%-about 4.0% by weight.

5. The emulsifying composition according to claim 1, consisting of:
   from about 20.0% to about 33.0% by weight of polyglycerides of oleic acid as non-ionic polymer;
   from about 6.0% to about 10.0% by weight of sorbitan tristearates as lipophilic non-ionic surfactant;
   from about 16.0% to about 29.0% by weight of Polyoxyethylenesorbitan Trioleate as hydrophilic non-ionic surfactant;
   from about 6.5% to about 11.5% by weight of sodium lauryl sulfate as anionic surfactant;
   from about 9.5% to about 16.5% by weight of phosphatidylcholine or lecitine, and their admixtures as amphoteric surfactant;
   from about 3% to about 13% by weight of erucic acid as lubricant;
   from about 1.0% to about 3.0% by weight of tert-butyl alcohol as octane booster;
   from about 2.0% to about 5.0% by weight of anti-freezing agents;
   from about 2.0% to about 7.0% by weight of sodium carboxymethyl cellulose as emulsion stabilizer;
   from about 1.0% to about 4.0% by weight of tributyl triphosphate as antifoam agent; and
   from about 0.5%-about 4.0% by weight of silica as adjuvant.

6. The emulsifying composition according to claim 1, wherein the composition has an overall HLB value from about 2.9 to about 3.5.

7. Micro-emulsion of water in diesel oil comprising:
   from about 5.0% to about 30.0% by weight of water,
   from about 95.0% to about 70.0% by weight of diesel oil, and
   the emulsifying composition according to claim 1 in amount of, at most, about 3.0% by weight.

8. The micro-emulsion according to claim 7 comprising from about 8% to about 15% of water as fuel for automotive.

9. The micro-emulsion according to claim 7 comprising from about 15% to about 22% of water, as fuel for heating applications.

10. The micro-emulsion according to claim 7, comprising at most about 2.0%, by weight of the emulsifying composition.

11. The micro-emulsion according to claim 7, characterized by one or more of the following parameters:
    an interfacial tension lower than about 0.03 μN/m and/or particles radius lower than about 1 μm, and/or
    a sediment lower than about 1% and no visible free water after centrifugation according to UNICHIM MU 1548.

12. A process for the manufacture of a water in diesel oil micro-emulsion comprising:
    providing a diesel oil in amount from about 95.0% to about 70.0% by weight with respect to a total weight of the final micro-emulsion;
    adding the emulsifying composition according to claim 1, in amount of at most about 3.0% by weight with respect to the total weight of the final micro-emulsion, to the diesel oil;

optionally pre-mixing the emulsifying composition and the diesel oil until an admixture is obtained;

adding from about 5.0% to about 30.0% by weight with respect to the total weight of the final micro-emulsion of water;

passing the admixture at least once through a mixing device, and optionally recirculating the admixture through the mixing device, until the micro-emulsion is obtained.

13. The process according to claim 12, wherein the admixture is recirculated from 7 to 11 times through the mixing device.

14. A water in diesel oil micro-emulsion according to claim 7 obtainable by the process of claim 12.

15. A method of fueling a diesel engine or a heating burner, the method comprising fueling the diesel engine or the heating burner with a water in diesel oil micro-emulsion according to claim 14.

16. The emulsifying composition according to claim 2 comprising:
   from about 24.0% to about 26.0% by weight of the non-ionic polymer
   from about 7.0% to about 8.0% by weight of the lipophilic non-ionic surfactant;
   from about 20.0% to about 22.0% by weight of the hydrophilic non-ionic surfactant;
   from about 8.0% to about 8.5% by weight of the anionic surfactant; and
   from about 11.0% to about 13.0% by weight of the amphoteric surfactant.

17. The emulsifying composition according to claim 3, wherein the non-ionic polymer is selected from among polyglycerides of oleic, linoleic, and linolenic fatty acids.

18. The emulsifying composition according to claim 5, consisting of:
   from about 24.5% to about 25.1% by weight of polyglycerides of oleic acid as non-ionic polymer;
   from about 7.2% to about 7.8% by weight of sorbitan tristearates as lipophilic non-ionic surfactant;
   from about 20.5% to about 21.5% by weight of Polyoxyethylenesorbitan Trioleate as hydrophilic non-ionic surfactant;
   from about 8.0% to about 8.5% by weight of sodium lauryl sulfate as anionic surfactant;
   from about 12.0% to about 12.5% by weight of phosphatidylcholine or lecitine, and their admixtures as amphoteric surfactant;
   from about 11.0% to about 12.5% by weight of erucic acid as lubricant;
   from about 1.8% to about 2.2% by weight of tert-butyl alcohol as octane booster;
   from about 3.0% to about 4.0% by weight of an admixture of 1,3-dioxolane, tetrahydrofurane, diclorobenzyl alcohol and 1,2-dimethoxy ethane;
   from about 4.0% to about 5.5% by weight of sodium carboxymethyl cellulose as emulsion stabilizer;
   from about 2.1% to about 2.3% by weight of tributyl triphosphate as antifoam agent; and
   from about 1.5% to about 2.2% by weight of silica as adjuvant.

* * * * *

UNITED STATES PATENT AND TRADEMARK OFFICE
CERTIFICATE OF CORRECTION

PATENT NO. : 10,316,264 B2
APPLICATION NO. : 15/525739
DATED : June 11, 2019
INVENTOR(S) : Marco Luigi Fumagalli Page 1 of 1

It is certified that error appears in the above-identified patent and that said Letters Patent is hereby corrected as shown below:

On the Title Page

[73] Assignee should read: EME FINANCE LTD.
London, England

Signed and Sealed this
Twenty-fourth Day of December, 2019

Andrei Iancu
*Director of the United States Patent and Trademark Office*